Aug. 7, 1928.
O. E. HUNT
1,679,972
TIRE CARRIER
Filed May 19, 1924
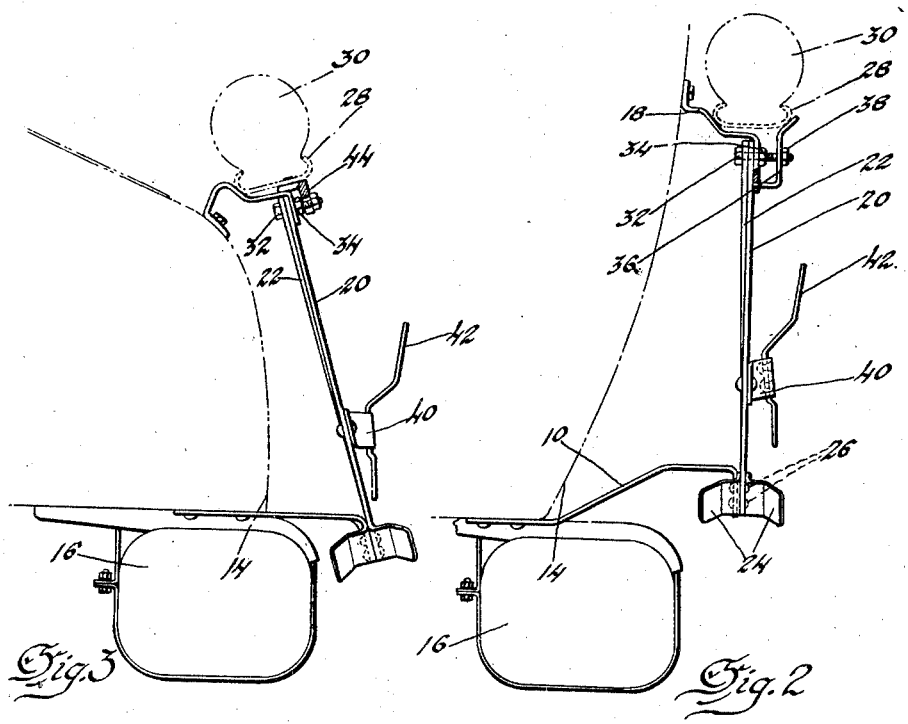
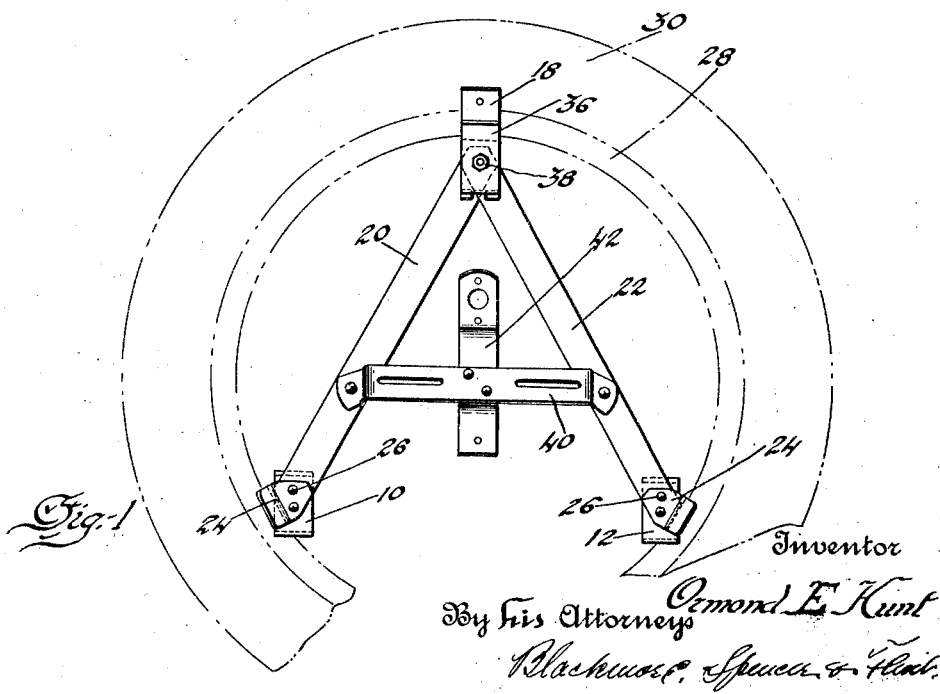
Inventor
Ormond E Hunt
By his Attorneys
Blackmore, Spencer & Flint Patented Aug. 7, 1928.

1,679,972

UNITED STATES PATENT OFFICE.

ORMOND E. HUNT, OF DETROIT, MICHIGAN, ASSIGNOR TO GENERAL MOTORS CORPORATION, OF DETROIT, MICHIGAN, A CORPORATION OF DELAWARE.

TIRE CARRIER.

Application filed May 19, 1924. Serial No. 714,348.

This invention relates to tire carriers such as are commonly used on automobiles for carrying spare tires, and is illustrated as embodied in the tire carrier at present regularly furnished on Chevrolet automobiles.

An object of the invention is to provide an inexpensive structure, utilizing sheet metal stampings, which is strong and rigid, and from which the spare rim may be readily removed. In the form illustrated in the drawings, the carrier comprises three brackets carried by the automobile, and spaced at the apices of a triangle inscribed in the spare rim, and suitably braced. Two of the brackets have permanent rim-engaging parts, and the third has a movable or detachable device for holding the rim. Preferably a cross member between the braces connecting the brackets is utilized to support a license plate and tail light. It may have a support which is reversible to hold the license plate on a roadster at approximately the same angle as on a touring car.

The above and other objects and features of the invention, including various desirable particular constructions, will be apparent from the following description of the illustrative embodiment shown in the drawings, in which:

Figure 1 is a rear elevation of the tire carrier;

Figure 2 is a side elevation thereof, with adjacent parts of a touring car shown diagrammatically; and Figure 3 is a side elevation with the carrier mounted on a coupé or roadster, and showing a modified form.

In the first illustrated embodiment, which is at present standard equipment on the Chevrolet, the carrier comprises a pair of alined lower end brackets 10 and 12 secured to the bottom of the body 14 just above the fuel tank 16, and an upper center bracket 18 secured to the rear of the body 14. The bracket 18 is connected to brackets 10 and 12 by braces 20 and 22. At each of the brackets 10 and 12 a pair of stampings 24, held by the rivets 26 which secure the bracket and brace together, are arranged as a fork to engage and hold the rim 28 of a spare tire 30. The bracket 18 has a portion engaging the rim 28, and is secured to braces 20 and 22 by a bolt 32 and nut 34. Bolt 32 also serves as a clamping bolt for a clamp or wedge lug 36 detachably holding the rim, and held by a nut 38.

Braces 20 and 22 are connected by a cross member 40 carrying a bracket 42 for a license plate and tail lamp. As will be apparent from comparison of Figures 2 and 3, the engaging parts of the cross member 40 and bracket 42 are bent at such angles that the member 40 may be reversed on a roadster or coupé (Figure 3), with respect to its position on a touring car or sedan (Figure 2), and will hold the bracket at the same angle in both cases.

As shown in Figure 3, the stampings 24 may be omitted by bending the ends of the bracket 10 (or 12) and brace 20 (or 22) to form opposite sides of the fork. Also the clamp 36 may be omitted, the clamping bolt 32 passing directly through one of the wedge lugs 44 of the rim. Preferably one wedge lug, to facilitate its use in this manner, has a U-shaped opening in place of the usual perforation,—that is, it is forked to straddle the bolt 32.

While two illustrative embodiments of the invention have been described in detail, it is not my intention to limit its scope to these particular embodiments, or otherwise than by the terms of the appended claims.

I claim:

1. A tire carrier comprising, in combination, three brackets secured to an automobile and spaced at the apices of a triangle inscribed in a spare rim, a pair of braces diverging from one center bracket to the other two end brackets, a cross member between the braces which is constructed and arranged to support a license plate and a tail light, rim-holding forks carried by the two end brackets, the center bracket being formed to engage and support one side of the rim, and a clamp detachably carried by the center bracket and engaging and supporting the other side of the rim.

2. A tire carrier comprising, in combination, three brackets secured to an automobile and spaced at the apices of a triangle inscribed in a spare rim, a pair of braces diverging from one center bracket to the other two end brackets, a cross member between the braces which is constructed and arranged to support a license plate and a tail light, rim-holding forks carried by the two end brackets, the center bracket being formed to engage and support one side of the rim, a clamp detachably carried by the center bracket and engaging and supporting the other side of the rim, and a single bolt securing the center bracket to the two braces and serving as a clamping bolt for said clamp.

3. The combination with a tire carrier having spare tire supporting parts, and parts adapted to be attached to a touring car to hold the carrier in a generally upright position or to a roadster or coupé to hold the carrier in an inclined position, of a bracket adapted to be mounted on said carrier comprising an article supporting portion and a mounting portion, said portions extending in angularly related planes whereby said bracket may be rotated through 180° prior to being secured to the carrier in order to vary the angularity of the article supporting portion to accommodate the bracket to the type of vehicle to which the carrier is secured.

4. In a tire carrier, the combination of a plurality of spaced strap metal supporting brackets provided with flanged portions, one of said brackets being formed with a shoulder for receiving one edge of a spare tire, a plurality of flat strap like members connecting certain of said brackets, the ends of said members overlying said flanges, rim holding members overlying said flanged portions, and means for securing said rim holding members and braces to said brackets.

5. In a tire carrier, the combination of a supporting bracket formed to receive a spare tire, said bracket being provided with a down-turned flange, a brace for said bracket having a portion overlying said flange, means for securing said brace to said flange, a clamp cooperatively associated with the tire receiving portion of said bracket and movable toward and from the same adapted for engagement with a spare tire to hold it on said bracket, and means for detachably securing said clamp to said bracket, said last named means comprising, in part, a continuation of said first named securing means.

6. In a tire carrier, the combination of a pair of spaced supporting brackets, each having a lateral flange, a brace member connecting said brackets and having its opposite end portions overlying the flanges of the respective brackets, a pair of outwardly diverging rim supporting members, having portions overlying the flange of one of said brackets, common means for securing the overlying portions of the last mentioned bracket, the rim supporting members and adjacent end portion of the brace in assembled relation, a tire engaging clamp cooperatively associated with the other of said brackets to hold a spare tire thereon, and having a portion overlying the flange of said bracket, and common means for permanently securing the overlying portions of said flange and brace in assembled relation and detachably securing the clamp in place.

In testimony whereof I affix my signature.

ORMOND E. HUNT.